US011276190B2

(12) United States Patent
Duan et al.

(10) Patent No.: US 11,276,190 B2
(45) Date of Patent: *Mar. 15, 2022

(54) ACTIVE IMAGE DEPTH PREDICTION

(71) Applicant: Snap Inc., Santa Monica, CA (US)

(72) Inventors: Kun Duan, Los Angeles, CA (US);
Daniel Ron, Lexington, MA (US);
Chongyang Ma, Los Angeles, CA (US); Ning Xu, Irvine, CA (US);
Shenlong Wang, Toronto (CA);
Sumant Milind Hanumante, Marina Del Rey, CA (US); Dhritiman Sagar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,468

(22) Filed: Apr. 27, 2020

(65) Prior Publication Data

US 2020/0258248 A1 Aug. 13, 2020

Related U.S. Application Data

(63) Continuation of application No. 16/120,105, filed on Aug. 31, 2018, now Pat. No. 10,672,136.

(51) Int. Cl.
*G06T 7/536* (2017.01)
*G06T 11/60* (2006.01)

(52) U.S. Cl.
CPC ............ *G06T 7/536* (2017.01); *G06T 11/60* (2013.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 10,672,136 B2 | 6/2020 | Duan et al. |
| 2013/0127823 A1 | 5/2013 | Diverdi et al. |
| 2013/0329068 A1* | 12/2013 | Hamanaka ......... H04N 5/23206 348/218.1 |
| 2014/0282278 A1* | 9/2014 | Anderson ........... G06F 3/04883 715/863 |
| 2018/0211128 A1 | 7/2018 | Hotson et al. |

(Continued)

FOREIGN PATENT DOCUMENTS

| CN | 112639876 A | 4/2021 |
| WO | WO-2020047261 A1 | 3/2020 |

OTHER PUBLICATIONS

"U.S. Appl. No. 16/120,105, Non Final Office Action dated Oct. 1, 2019", 15 pgs.

(Continued)

*Primary Examiner* — Edward Martello
(74) *Attorney, Agent, or Firm* — Schwegman Lundberg & Woessner, P.A.

(57) ABSTRACT

An active depth detection system can generate a depth map from an image and user interaction data, such as a pair of clicks. The active depth detection system can be implemented as a recurrent neural network that can receive the user interaction data as runtime inputs after training. The active depth detection system can store the generated depth map for further processing, such as image manipulation or real-world object detection.

20 Claims, 16 Drawing Sheets

(56) References Cited

U.S. PATENT DOCUMENTS

2019/0026602 A1    1/2019  Leng et al.
2019/0242975 A1*   8/2019  Tai .................. G06K 9/6271
2020/0074653 A1    3/2020  Duan et al.

OTHER PUBLICATIONS

"U.S. Appl. No. 16/120,105, Notice of Allowance dated Jan. 21, 2020", 8 pgs.

"U.S. Appl. No. 16/120,105, Supplemental Notice of Allowability dated Apr. 22, 2020", 2 pgs.

"International Application Serial No. PCT/US2019/048823, International Search Report dated Dec. 13, 2019", 3 pgs.

"International Application Serial No. PCT/US2019/048823, Written Opinion dated Dec. 13, 2019", 5 pgs.

Chen, Weifeng, et al., "Single-Image Depth Perception in the Wild", arXiv.org, [Online] Retrieved from the internet: <https://arxiv.org/abs/1604.03901> on [retrieved on Dec. 2, 2019]., (Jan. 6, 2017), 1-14.

Lee, Seungsoo, et al., "Implementing a Depth Map Generation Algorithm by Convolutional Neural Network", Journal of Broadcast Engineering, 23(1), (Jan. 2018), 3-10.

Yang, Yan, et al., "ADMM-Net: A Deep Learning Approach for Compressive Sensing MRI", arXiv.org, [Online] Retrieved from the internet: <https://aixiv.org/abs/1705.06869> on [retrieved on Dec. 2, 2019]., (May 19, 2017), 1-14.

"International Application Serial No. PCT/US2019/048823, International Preliminary Report on Patentability dated Mar. 11, 2021", 7 pgs.

"European Application Serial No. 19854179.9, Extended European Search Report dated Aug. 23, 2021", 7 pgs.

Zoran, Daniel, "Learning Ordinal Relationships for Mid-Level Vision", 2015 IEEE International Conference on Computer Vision (ICCV), IEEE, (Dec. 7, 2015), 388-396.

* cited by examiner

US 11,276,190 B2

ACTIVE IMAGE DEPTH PREDICTION

CLAIM OF PRIORITY

This application is a continuation of U.S. patent application Ser. No. 16/120,105, filed on Aug. 31, 2018, which is incorporated herein by reference in its entirety.

TECHNICAL FIELD

Embodiments of the present disclosure relate generally to machine learning and, more particularly, but not by way of limitation, to image-based depth estimation.

BACKGROUND

Depth estimation schemes attempt to determine the depths of objects depicted in images (e.g., an image, video). The depth data can be useful for different image-based tasks, such as augmented reality, image focusing, and face parsing. Some depth detection techniques use external signals (e.g., infrared beams) to bounce off nearby objects to assist in determining the depths of objects in a given image. While these external-signal-based approaches can yield accurate results, many user devices (e.g., a smartphone, a laptop) are not equipped with the necessary hardware (e.g., infrared (IR) laser, IR camera) to enable signal-based depth detection. Determining depths directly from a single image is difficult because of the inherent ambiguities between an object's appearance in an image and its real-world geometry.

BRIEF DESCRIPTION OF THE DRAWINGS

To easily identify the discussion of any particular element or act, the most significant digit or digits in a reference number refer to the FIG. number in which that element or act is first introduced.

DETAILED DESCRIPTION

Figure 1:
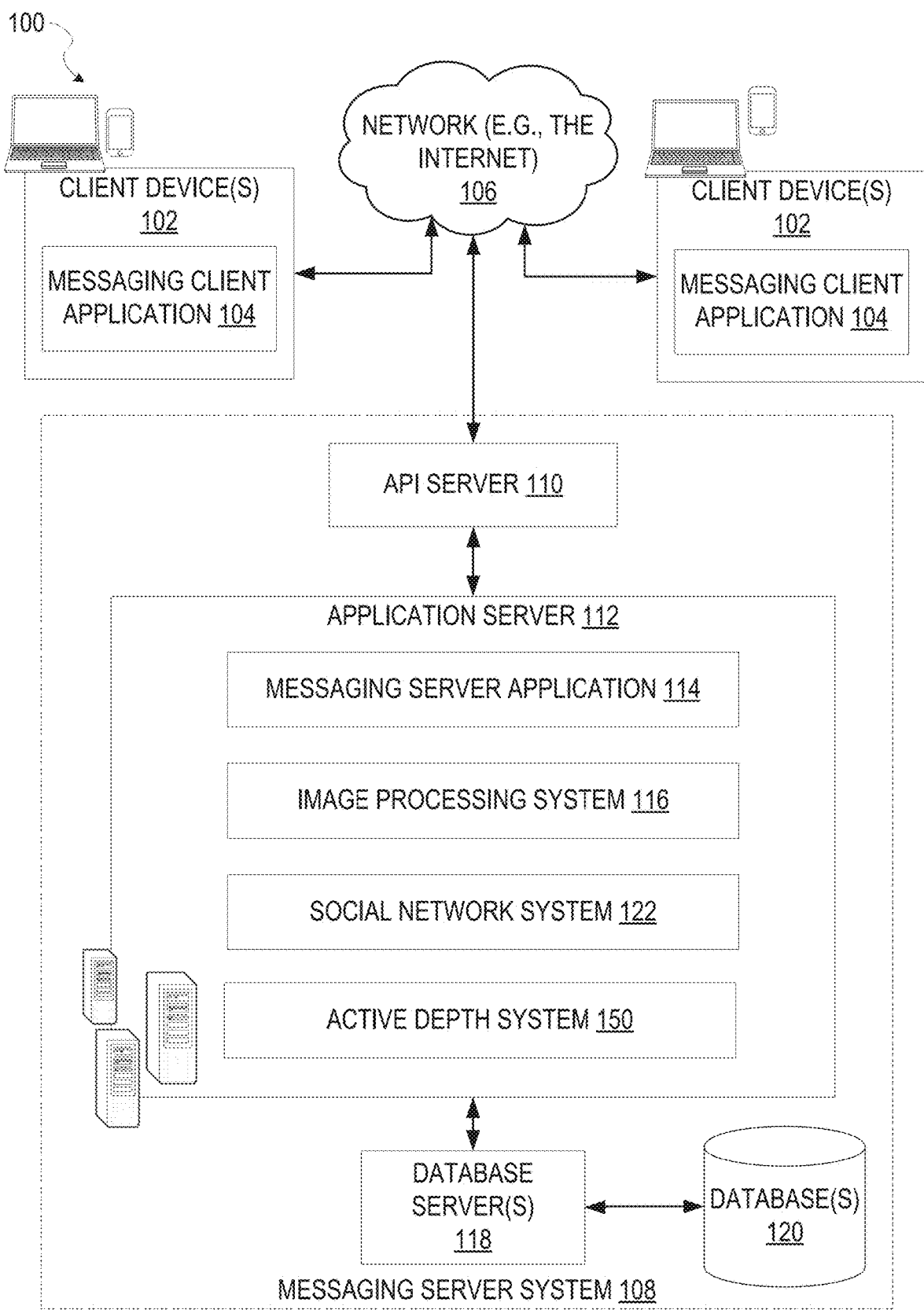
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, determining the depths of objects depicted in an image is difficult. While some external-signal-based approaches can assist in image-based depth detection, many end-user systems (e.g., client devices, smartphones, laptops) lack the specialized equipment required to implement these signal-based approaches.

To this end, an active depth detection system can be implemented to determine depths of objects directly from an image using runtime end-user-provided data (e.g., end-user input data provided to the system after training). According to some approaches, the active depth detection system includes one or more neural networks that are configured to generate a depth map and refine the depth map using end-user-provided depth data (e.g., ordinal pairs, such as a pair of clicks or screen taps on an image).

For example, a client device can display an image and a user can select (e.g., screen-tap, click, or specify image coordinates for) a first point in the image, followed by a second point in the image. The active depth detection system generates a vector from the first point to the second point to indicate a depth detection (e.g., to indicate that the first point corresponds to a part of the image that is closer to the viewer than the part of the image that corresponds to the second point, or vice-versa). The vector can be input into the neural network system which has been trained to update a depth map using the ordinal pair (e.g., the pair of clicks) as constraints.

In some example embodiments, the active depth detection system is trained using end-to-end training techniques (e.g., back propagation). After the model is trained, it can be downloaded for use by different users as part of a user application (e.g., a messaging client application 104 discussed below). When the user generates an image, the system can first generate an initial depth map using a base network, such as a Fully Convolutional Residual Neural Network (FCRN). The active depth detection system can then refine the initial depth map using ordinal constraints (e.g., pairs of clicks) that indicate depth directions of imaged regions (e.g., regions in the original image; regions in the initial depth map). In some example embodiments, the active depth detection system implements a recurrent neural network that is configured as an Alternating Direction Method of Multipliers (ADMM) module with multiple layers. The recurrent neural network can be executed over multiple iterations to generate variables processed in the different layers. The output of the recurrent neural network is a refined depth map that can be used for further processing, such as image manipulation. Although in the following examples, the refined depth map is used for image processing, other uses are possible. For example, the active depth detection system can be implemented in an augmented reality system to more accurately generate simulations that modify the appearance of a user's surrounding environment. As an additional example; the active depth detection system can be implemented as part of an autonomous vehicle vision system to ascertain relative depths of objects depicted in one or more images.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). In various embodiments, virtual machine learning can be used by the messaging client application 104 and/or an image processing system 116 to analyze images sent within the messaging system 100 and to use this analysis to provide features within the messaging system 100.

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, include functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, image search data, social network information, and live event information, as examples, some of which rely on information generated by analyzing images sent through the messaging system 100. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112. In some embodiments, the database 120 may also store results of image processing or details of various trained and untrained support vector machines that may be used by the messaging server system 108.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections: the retrieval of a list of friends of a user of a client device 102; the retrieval of messages and content; the addition and deletion of friends to and from a social graph; the location of friends within the social graph; and application events (e.g., relating to the messaging client application 104).

The application server 112 hosts a number of applications and subsystems, including the messaging server application 114, the image processing system 116, a social network system 122, and an active depth system 150, according to some example embodiments. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., an entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
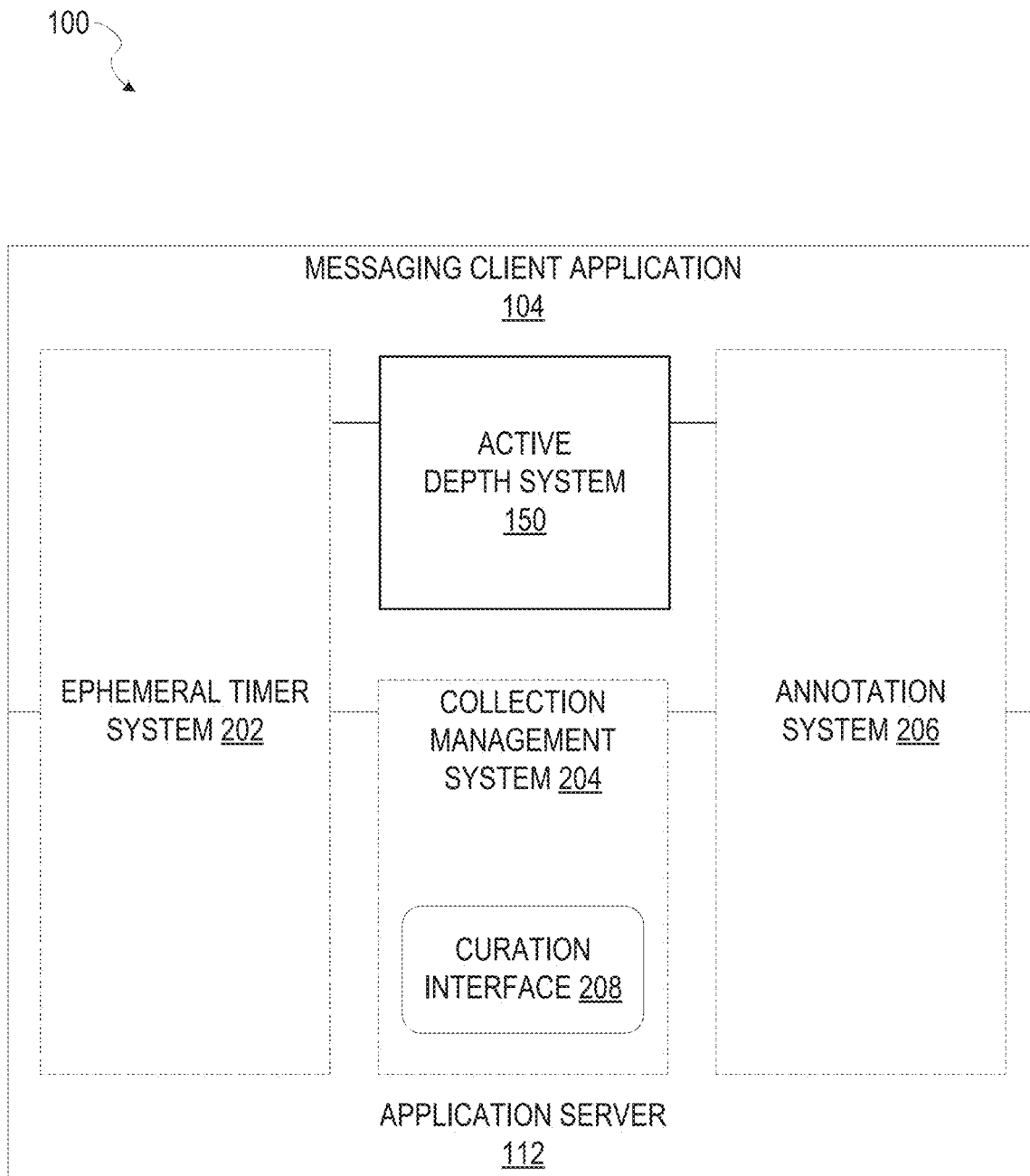
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and the active depth system 150.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content in a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

Figure 3:
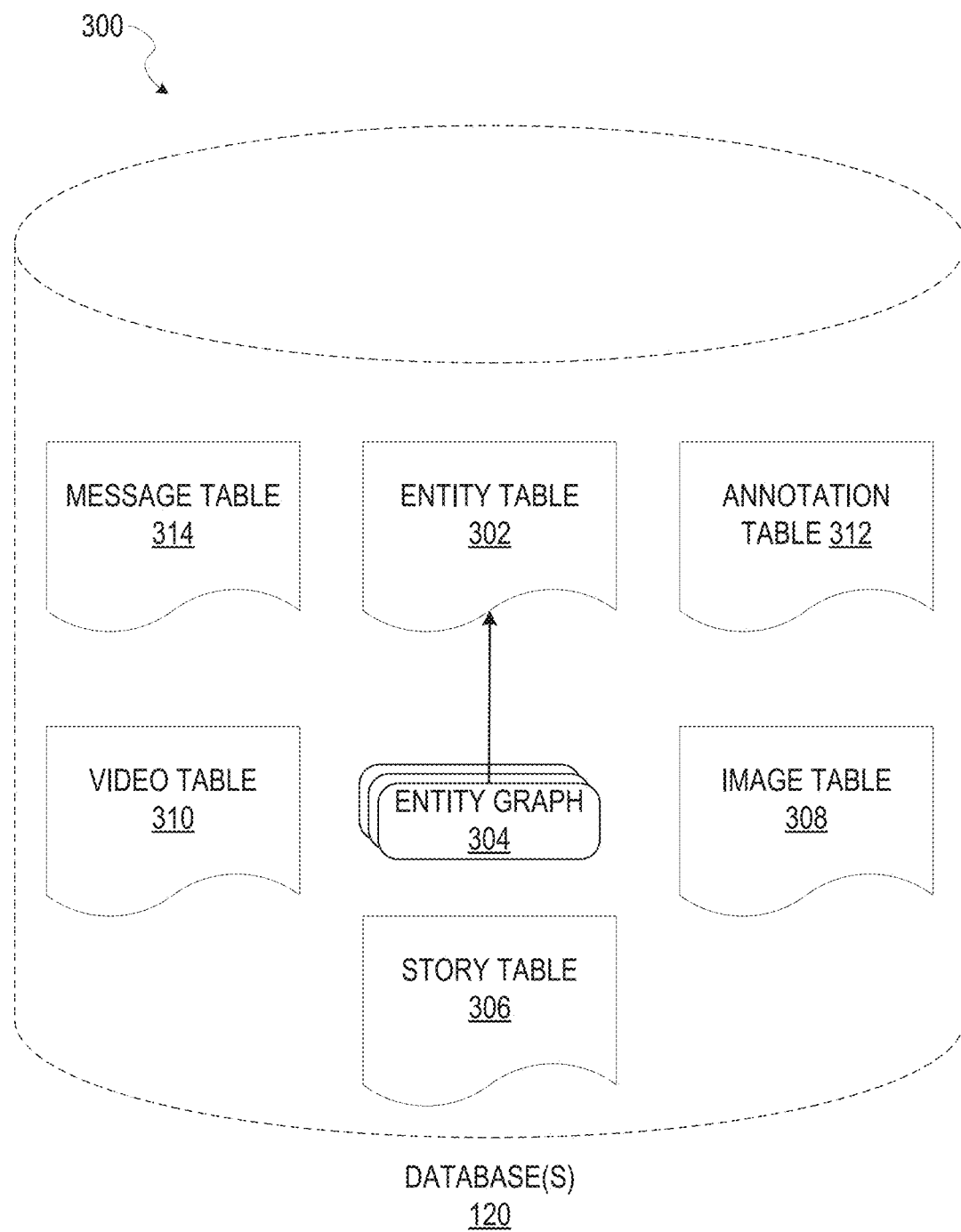
FIG. 3 is a schematic diagram illustrating data that may be stored in a database of a messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time FIG. 3 is a schematic diagram illustrating data 300, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Merely for example, such relationships may be social, professional (e.g., work at a common corporation or organization), interest-based, or activity-based.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the annotation table is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
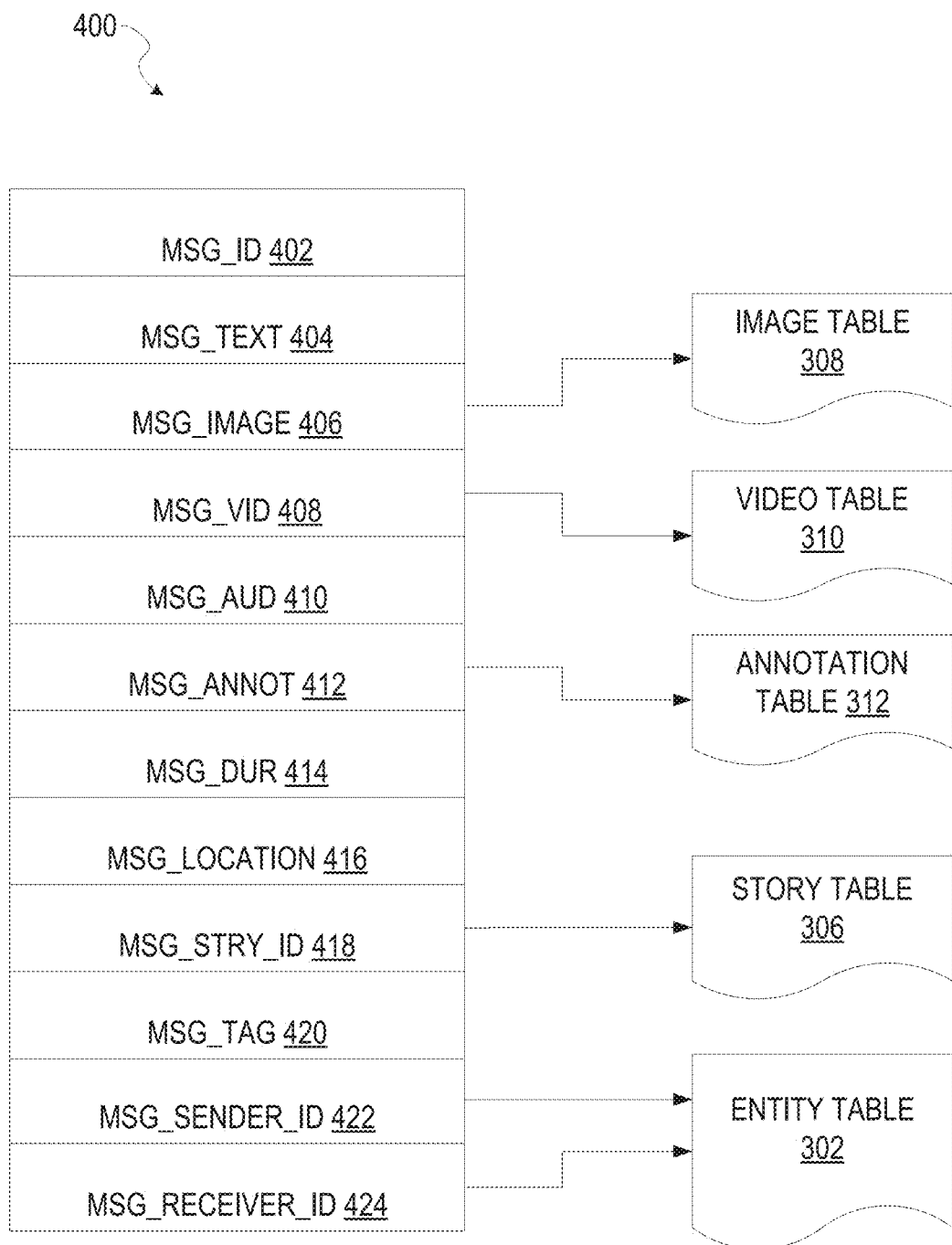
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102, and that is included in the message 400.

A message audio payload 410: audio data, captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may, point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
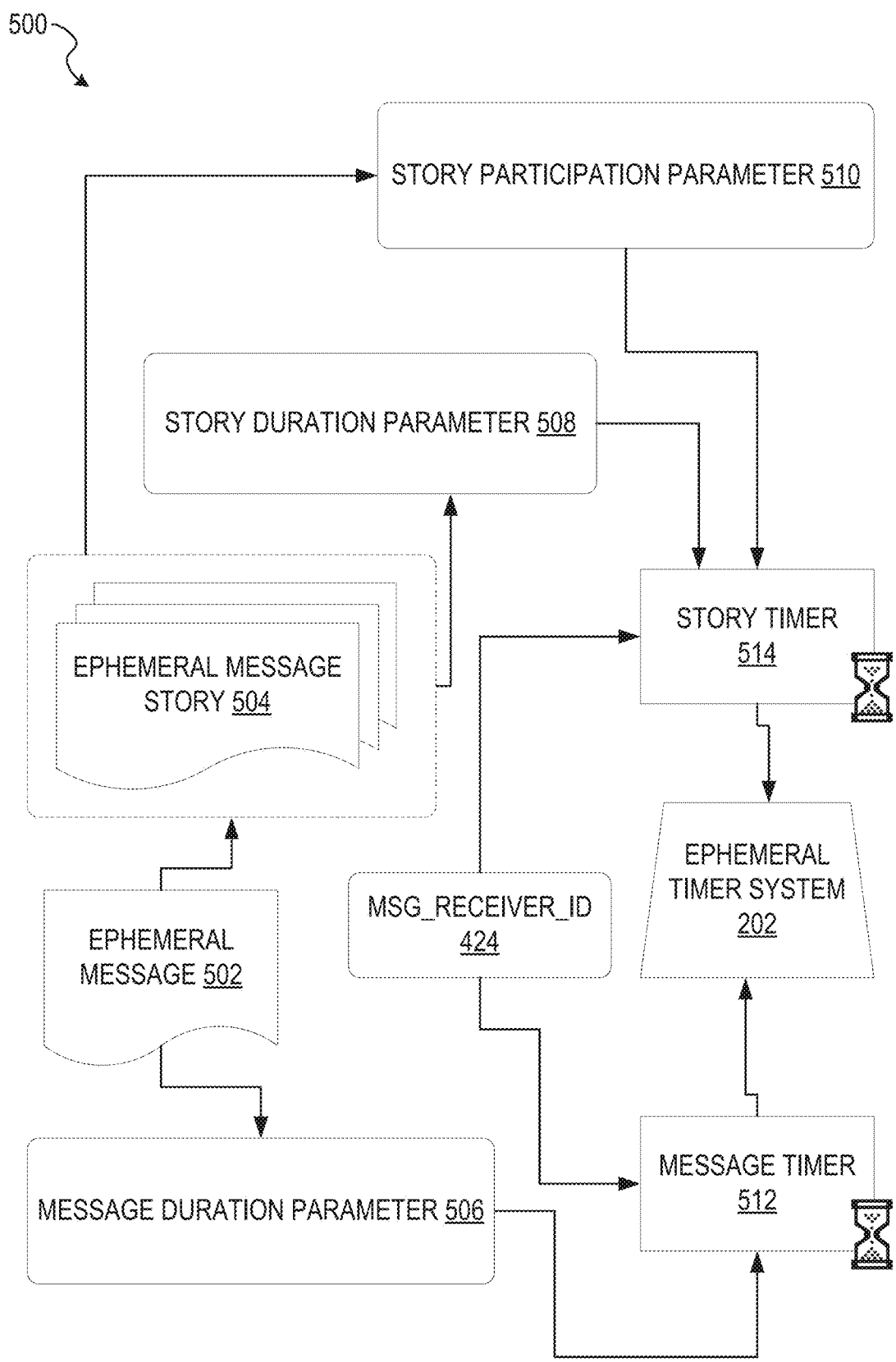
FIG. 5 is a schematic diagram illustrating an example access-limiting process, in terms of which access to content (e.g., an ephemeral message and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
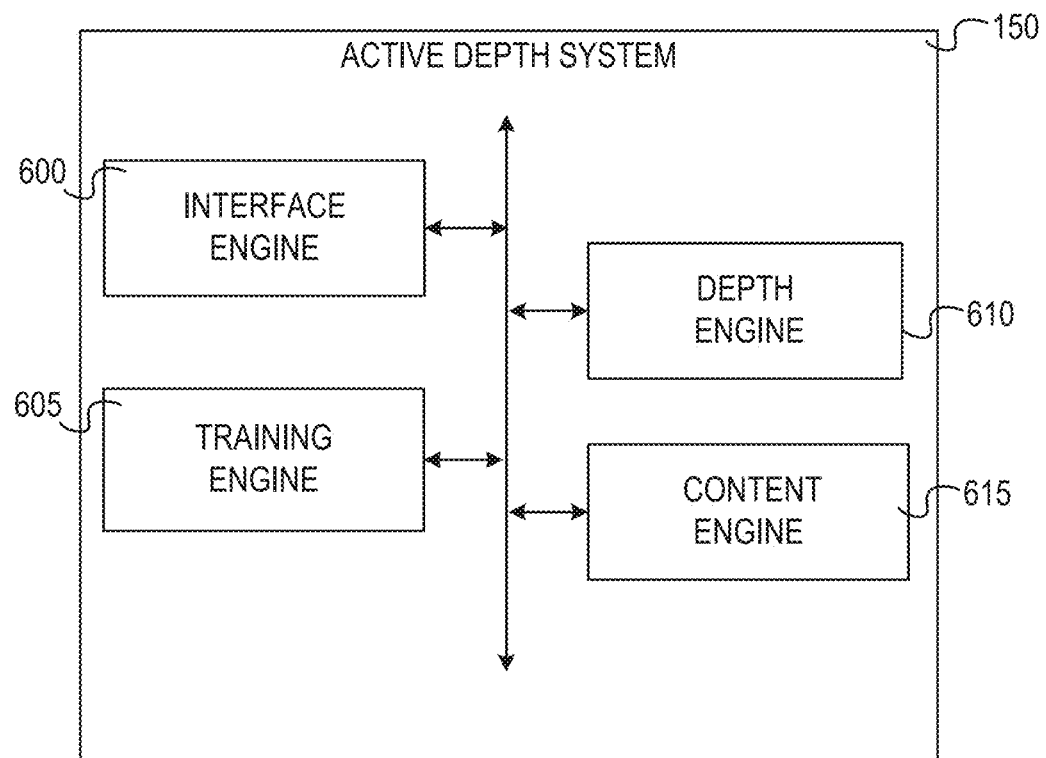
FIG. 6 shows example functional engines of an active depth system, according to some example embodiments.

FIG. 6 shows example functional engines of an active depth system 150, according to some example embodiments. As illustrated, the active depth system 150 comprises an interface engine 600, a training engine 605, a depth engine 610, and a content engine 615. The interface engine 600 manages communications with the messaging server application 114 to generate user interfaces, receive input data (e.g., click pairs, selection of a button), and generate content (e.g., images, video). The training engine 605 is configured to train the model implemented in the depth engine 610. The depth engine 610 is configured to generate a depth map from an individual image using the image and one or more ordinal constraints (e.g., click pairs) input by a user. The content engine 615 is configured to perform one or more actions using the depth map generated by the depth engine 610. For example, the content engine 615 can be configured to apply an image effect to an image using depth information generated by the depth engine 610, and/or overlay one or more items of content on the image.

Figure 7:
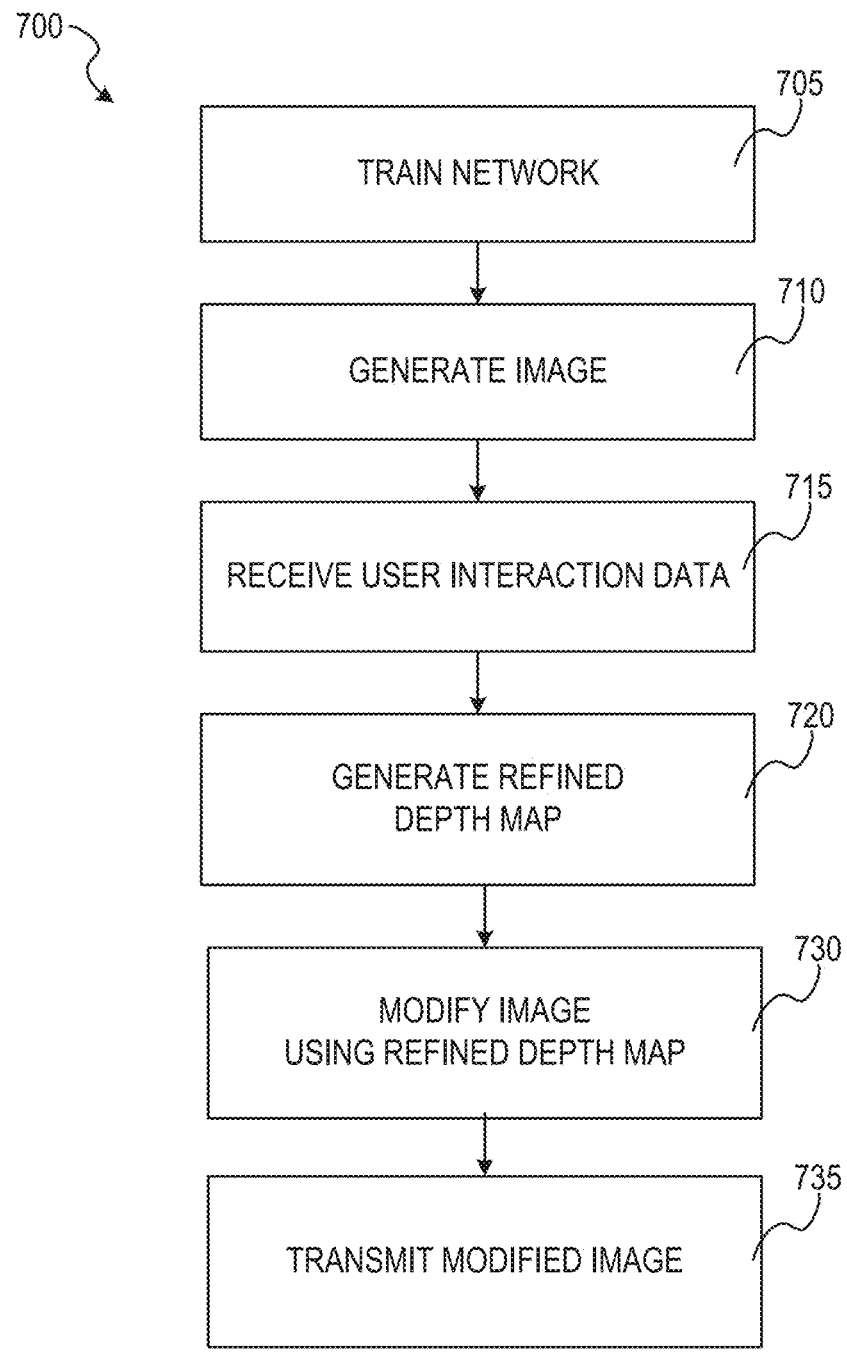
FIG. 7 shows a flow diagram of a method for implementing an active depth map, according to some example embodiments.

FIG. 7 shows a flow diagram of a method 700 for implementing an active depth map, according to some example embodiments. At operation 705, the training engine 605 trains an active depth system model, such as a network 900, discussed below with reference to FIG. 9A. Because the network 900 is fully differentiable, the network 900 can be trained end-to-end using gradient descent. At operation 710, the interface engine 600 generates an image. For example, the interface engine 600 generates an image using an image sensor of the client device 102. At operation 715, the depth engine 610 receives user interaction data. For example, at operation 715, the depth engine 610 receives click pair data as a sequence of screen taps on the image depicted on a display device of the client device 102. At operation 720, the depth engine 610 generates a refined depth map using the trained network 900, as discussed in further detail below with reference to FIGS. 9A and 9B. At operation 730, the content engine 615 modifies the image using the refined depth map that is generated by the depth engine 610. For example, at operation 730, the content engine 615 removes a background area of the generated image using the refined depth map generated at operation 720. At operation 735, the content engine 615 transmit the modified image as an ephemeral message (e.g., an ephemeral message 502) to a network site (e.g., a social media network site) for access by other network site users.

Figure 8:
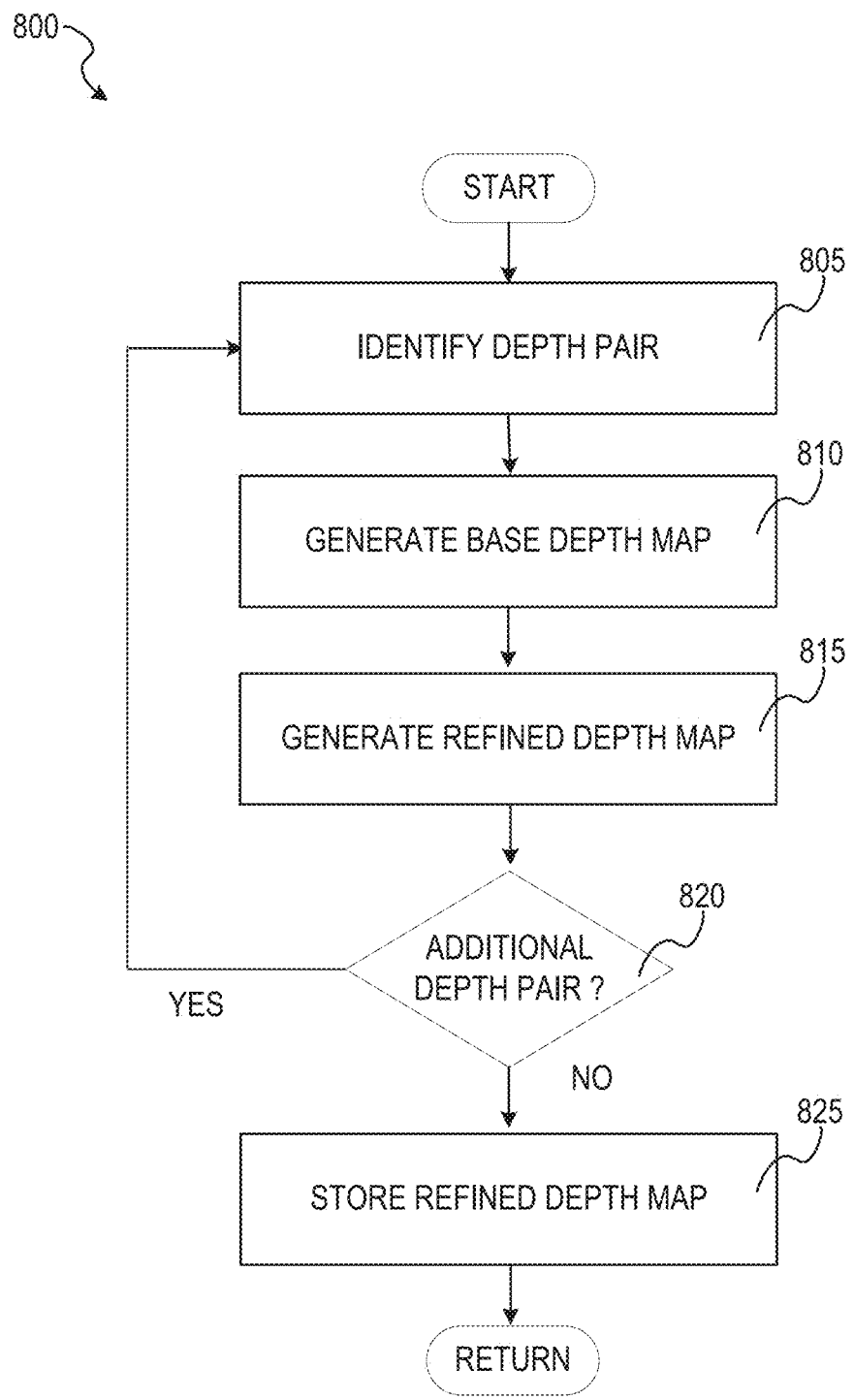
FIG. 8 shows a flow diagram of an example method for utilizing sets of click pair data, according to some example embodiments.

FIG. 8 shows a flow diagram of an example method 800 for utilizing sets of click pair data, according to some example embodiments. In some implementations, the user of the client device 102 inputs multiple pairs of clicks, each click pair set indicating a depth direction of a region in an image. The depth engine 610 can implement the method 800 as a subroutine of operation 720, in which a refined depth map is generated.

At operation 805, the depth engine 610 identifies an ordinal pair, such as a pair of clicks input by a user on an image displayed on a client device. At operation 810, the depth engine 610 generates a base depth map for refinement. For example, at operation 810, the depth engine 610 implements an FCRN to generate an initial depth map from an image (e.g., the image generated at operation 710, FIG. 7).

At operation 815, the depth engine 610 uses the received ordinal pair to further refine the base depth map. For example, at operation 815, the depth engine 610 runs an ADMM module one or more iterations to refine regions of the initial depth map. At operation 820, the depth engine 610 determines whether there are additional sets of ordinal pairs. If the user has input additional click pairs, then at operation 820 the method 800 continues to operation 805, and the depth engine 610 further refines the depth map using the additional ordinal pair information in operations 810 and 815. For example, a first ordinal pair may increase the depth accuracy of a first region of a depth map (e.g., the lower right corner), and a second ordinal pair may increase the depth accuracy of a second different region in the depth map (e.g., the upper left, corner), and so on. Alternatively, returning to operation 820, if the depth engine 610 determines that the user has not input further ordinal pairs, the method 800 proceeds to operation 825, in which the depth engine 610 stores the refined depth map.

Figure 9A:
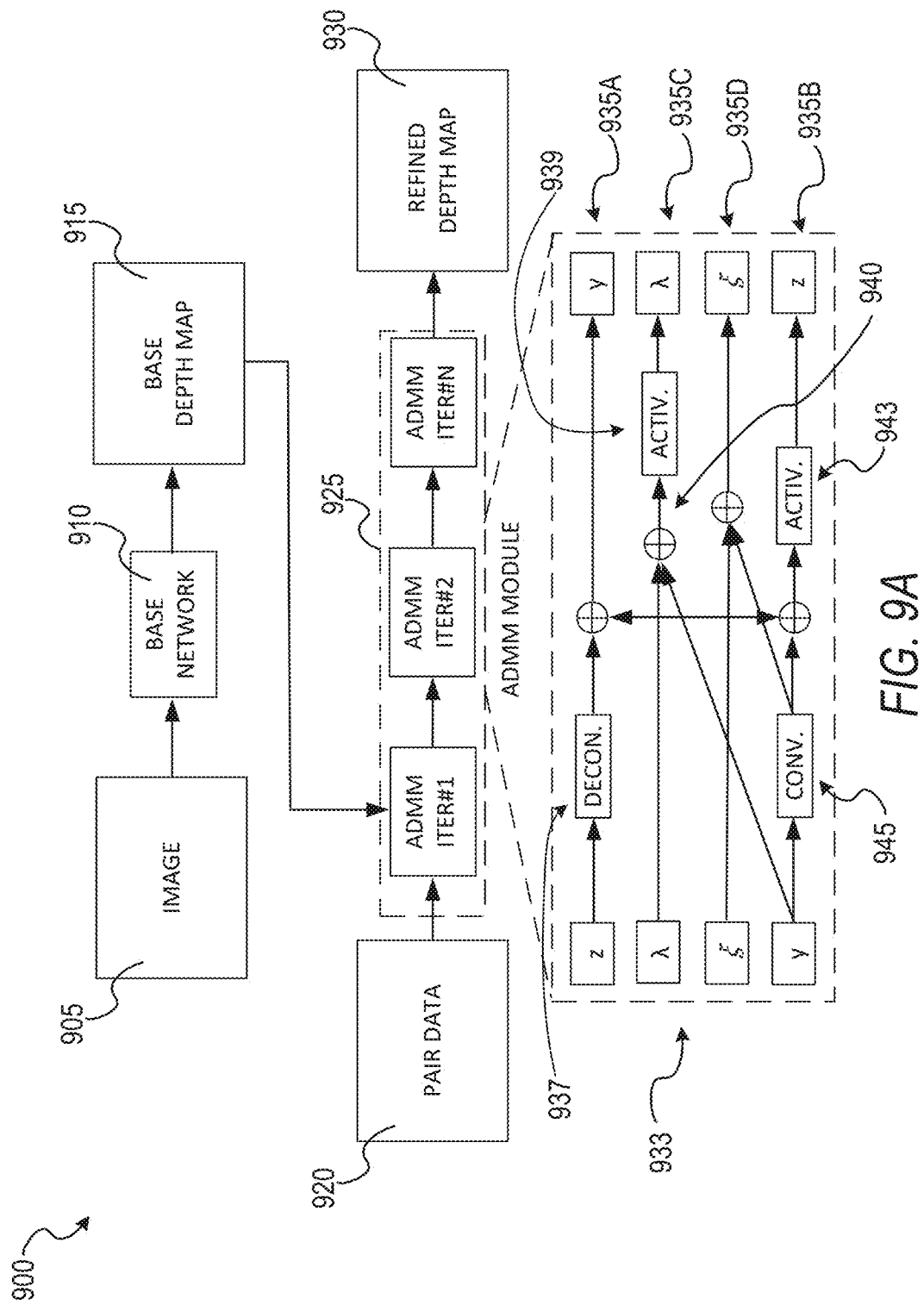
FIG. 9A shows an example network for a depth engine, according to some example embodiments.
Figure 9B:
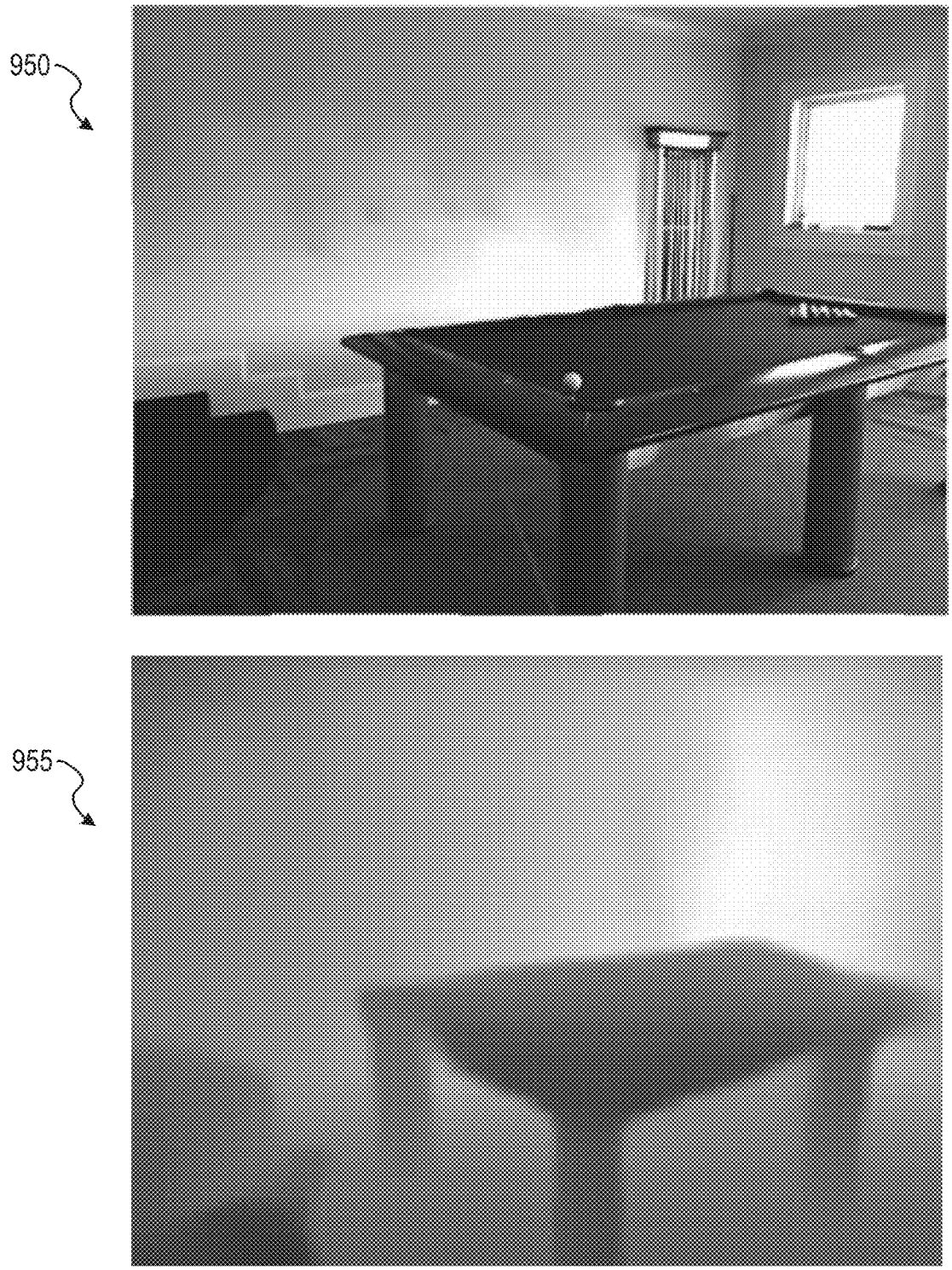
FIG. 9B shows an example image and depth map, according to some example embodiments.

FIG. 9A shows an example network 900 for the depth engine 610, according to some example embodiments. As illustrated, an initial image 905 is input into a base network 910 (e.g., a Fully Convolutional. Residual Neural Network (FCRN)) that generates a base depth map 915. FIG. 9B shows an example image 950 and depth map 955. The depth map 955 indicates the depth of different areas in the image 950 using data values, such as lightness and darkness. For instance, the pixels of the pool table are darker than the pixels of the wall in the depth map 955, which indicates that the pool table is closer to the viewer (e.g., user, camera lens) than the wall depicted behind the pool table. The depth map can be a separate file from its corresponding image, but can also be integrated into the image as extra channel data for each pixel.

Figure 11:
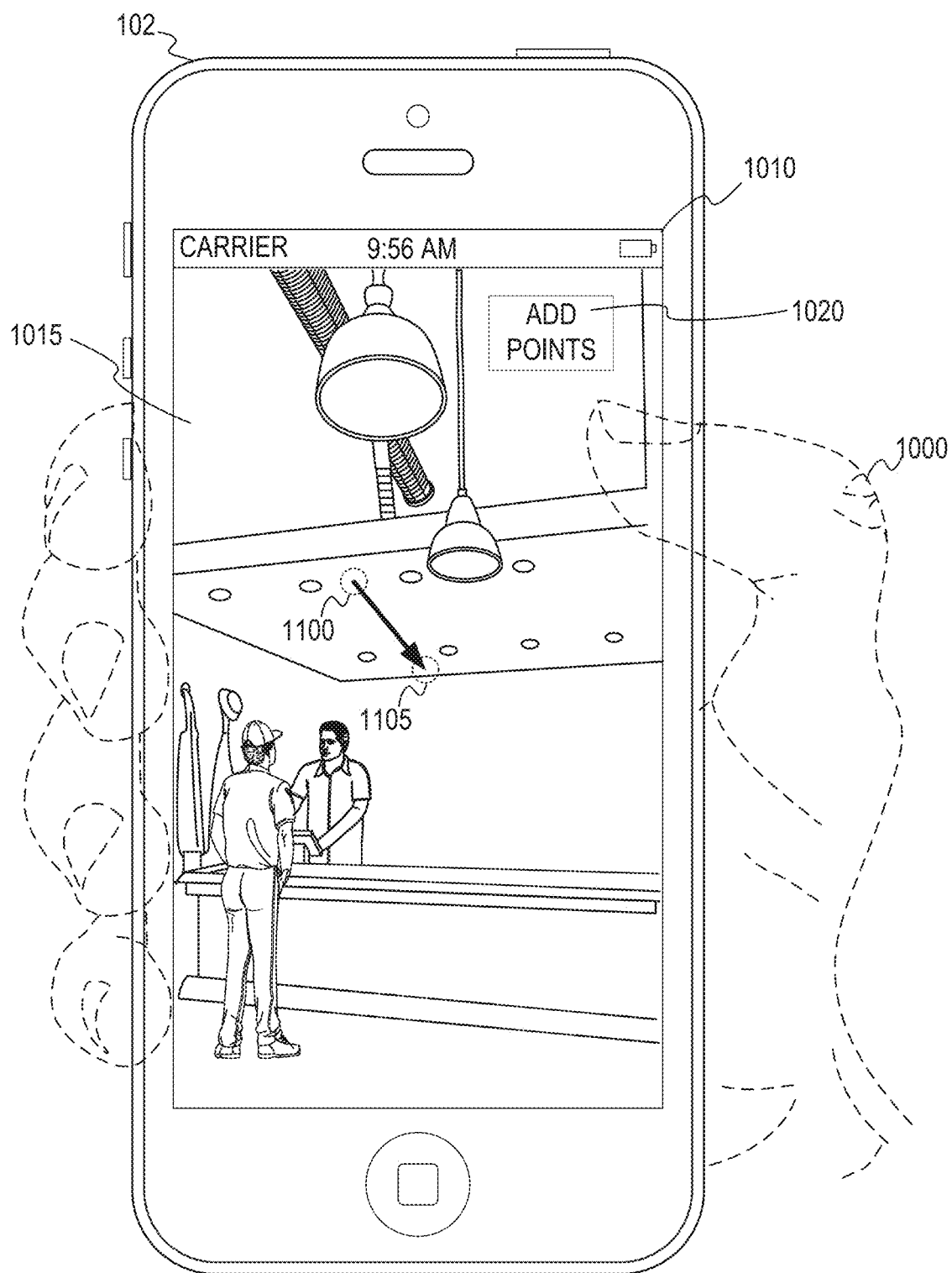

Returning to FIG. 9A, the base depth map 915 is input into an ADMM module 925, which operates in several iterations (e.g., iteration 1, iteration 2, . . . iteration n) to generate a refined depth map 930. Further input into the ADMM module 925 is pair data 920, which comprises pairs of points or clicks which specify relative orders between pairs of pixels in a depth direction, as illustrated in FIG. 11, discussed below.

In some example embodiments, the ADMM module 925 is implemented as a recurrent neural network that implements update rules to generate the refined depth map 930. The pair data 920 comprises user input guidance (e.g., clicks to indicate depth directions), which is used as ordinal constraints on the inferred depth estimations. The depth estimation can be modeled as a quadratic programming scheme with linear constraints. In particular, let N be the total number of pixels in an image, and let x and y be the vector representations for the input image and refined depth (respectively) to be solved. The refined depth values y are bounded within a range [0, D]. Given M pairs of ordinal constraints from user guidance (user click pairs), the objective function for optimizing y is:

$$y^* = \mathrm{argmin}_y f_u(y, x) + \sum_\alpha f_p(y_\alpha, x) \quad [1]$$

s.t.

$$Ay \leq B$$

$$\text{where } A = \begin{bmatrix} -I \\ I \\ P \end{bmatrix}, B = \begin{bmatrix} 0 \\ D1 \\ 0 \end{bmatrix},$$

I is the identity matrix, and 0 and 1 are vectors of all 0s and 1s. Furthermore, $f_u(y, x)$ is a unary potential encoding the prediction from a base deep neural network, and $f_p(y_\alpha, x)$ is a high-order potential encoding the spatial relationship between neighboring pixels. $Ay \leq B$ encodes the hard constraints for ordinal relations. The first two parts in A and B ensure that the refined depth output is within the valid range

[0, D]. P is an M×N matrix encoding M different ordinal constraints. We use $P_{kj}=1$ and $P_{kj'}=-1$ if (j, j') is an ordinal pair where k≤M.

The unary potentials $f_u$ are of the form $f_u(y, x; w) = \frac{1}{2}\|y-h(x; w)\|^2$ which measures the L2 distance between y and h(x; w). For estimating depths, h(x; w) indicates the output from a base depth prediction network (e.g., the base network 910) parameterized by network weights w. Minimizing the unary terms is equivalent to minimizing the mean squared error between refined depths and base network outputs.

The high-order potentials $f_p$ are of the form $f_p(y_\alpha, x; w) = h_\alpha(x; w)g_\alpha(W_\alpha y)$. Here $W_\alpha$ denotes a transformation matrix for a filtering operation, and $h_\alpha(x; w)$ provides per-pixel guidance information that places stronger local smoothness for pixels on low-frequency edges. The $h_\alpha(x; w)$ is constant for all the pixels to show improvement from ordinal constraints.

To solve for refined depth values y, the ADMM algorithm is implemented to handle non-differentiable objectives and hard constraints while maintaining fast convergence. Equation 1 is reconfigured using auxiliary variables $z=\{z_1, \ldots, z_A\}$. In particular:

$$y^* = \operatorname{argmin}_y \frac{1}{2}\|y - h(x; w)\|_2^2 + \sum_\alpha h_\alpha(x; w)g_\alpha(z_\alpha)$$
$$\text{s.t.}$$
$$Ay \leq B$$
$$W_\alpha y = z_\alpha, z_\alpha \in z$$

The augmented Lagrangian of the original objective function is then:

$$L_\rho(x, y, z, \lambda, \xi) = \frac{1}{2}\|y - h(x; w)\|_2^2 + \sum_\alpha h_\alpha(x; w)g_\alpha(z_\alpha) + \sum_\alpha \frac{\rho_\alpha}{2}\|W_\alpha y - z_\alpha\|_2^2 + \lambda^T(Ay - B) + \sum_\alpha \xi_\alpha^T(W_\alpha y - z_\alpha)$$

where $\rho_\alpha$ is a constant penalty hyperparameter, and $\lambda, \xi$ are Lagrange multipliers with $\lambda \geq 0$. The variables y, z, $\lambda$, $\xi$ are solved by alternating between the following subproblems.

To solve for refined depth y: the y update rule is the derivative of the Lagrangian function with respect to y:

$$\tilde{y} = \operatorname{argmin}_y \frac{1}{2}\|y - h(x; w)\|_2^2 + \sum_\alpha \frac{\rho_\alpha}{2}\|W_\alpha y - z_\alpha\|_2^2 + \lambda^T(Ay - B) + \sum_\alpha \xi_\alpha^T(W_\alpha y - z_\alpha) =$$
$$\left(I + \sum_\alpha \rho_\alpha W_\alpha^T W_\alpha\right)^{-1}\left(h(x; w) - A^T\lambda + \sum_\alpha W_\alpha^T(\rho_\alpha z_\alpha - \xi_\alpha)\right)$$

This step uses the term $A^T\lambda$ to encode the ordinal constraints and adjust the outputs from the base network. The depths are refined iteratively in a forward pass through the ADMM network modules.

To solve for auxiliary variables z: let $g_\alpha(\bullet) = \|\bullet\|_1$ be the L1 smoothness priors on y and S(a, b) be the soft thresholding function. The z update rules are obtained by solving a Lasso problem:

$$\tilde{z} = \operatorname{argmin}_{z_\alpha} h_\alpha(x; w)q_\alpha(z_\alpha) + \frac{\rho_\alpha}{2}\|W_\alpha y - z_\alpha\|_2^2 + \sum_\alpha \xi_\alpha^T(W_\alpha y - z_\alpha)$$

And for each $z_\alpha$:

$$\tilde{z}_\alpha = \operatorname{argmin}_{z_\alpha} h_\alpha(x; w)g_\alpha(z_\alpha) + \frac{\rho_\alpha}{2}\|W_\alpha y - z_\alpha\|_2^2 + \xi_\alpha^T(W_\alpha y - z_\alpha) =$$
$$S\left(W_\alpha y + \frac{\xi_\alpha}{\rho_\alpha}, \frac{h_\alpha(x; w)}{\rho_\alpha}\right)$$

To solve for Lagrangian multipliers $\lambda$ and $\xi$, the update rule for $\lambda$ is obtained using gradient ascent:

$$\tilde{\lambda} = \max(\operatorname{argmin}_\lambda \lambda(Ay - B), 0)$$
$$= \max(\lambda + \eta(Ay - B), 0)$$

Similarly, for each $\xi_\alpha$, we have the gradient ascent update rule:

$$\tilde{\xi} = \operatorname{argmin}_{\xi_\alpha} \xi_\alpha^T(W_\alpha y^{(n)} - z_\alpha)$$
$$= \xi_\alpha + \tau_\alpha(W_\alpha y - z_\alpha)$$

where $\eta$ and $\tau_\alpha$ are the hyperparameters denoting gradient update step sizes.

In some example embodiments, the ADMM module 925 is iterative in nature, weights are not shared, and the number of iterations is fixed to allow the ADMM module 925 to use convolutional neural networks with customized activation functions.

A call-out 933 shows different layers of the ADMM module 925, according to some example embodiments. The ADMM module 925 is configured to run an iteration of the above update rules, according to some example embodiments. The filters to encode the transformation $W_\alpha$ are learned via back propagation training. The data tensors $z_\alpha$, $\xi_\alpha$, and $\lambda$ are initialized as zeros.

In some example embodiments, the depth engine 610 uses five ADMM modules, which corresponds to running the ADMM module 925 for five iterations. Each ADMM instance contains 64 transformations $W_\alpha$ (e.g., each convolution layer includes 64 filters, each deconvolution layer includes 64 layers, etc.). In some example embodiments, since all operations in the ADMM module 925 are differentiable, the entire network 900 (e.g., the base network 910 and ADMM module 925) can be learned end-to-end using gradient descent. In some example embodiments, the network 900 implements a standard mean squared error (MSE) as the loss function.

A first layer 935A in the ADMM module 925 is configured to solve for refined depth y. Calculating the numerator corresponds to applying a deconvolution 937 (e.g., transposed convolution) step on each $\rho_\alpha z_\alpha - \xi_\alpha$ and taking the sum of results together. Calculating the denominator is performed by converting the deconvolution kernels to optical transfer functions and taking the sum. Calculating the final output is performed by first applying a fast Fourier transform (FFT) on the numerator followed by an inverse FFT on the division result.

A second layer 935B in the ADMM module 925 solves for auxiliary variables z. This can be done with a convolution layer 945 on y using the same filters shared with the deconvolution layer. The convolution layer output is passed (as indicated by pass operator 940) through a non-linear activation layer 943 that implements a standard soft thresholding function S(a, h). In practice, we implement this soft thresholding function using two rectified linear unit (ReLU) functions: $S(a, b)=ReLU(a-b)-ReLU(-\alpha-b)$. In some example embodiments, the convolution layer 945 does not share weights with the deconvolution layer in order to increase network capacity.

A third layer 935C and fourth layer 935D in the ADMM module 925 correspond to gradient ascent steps that solve for Lagrange multipliers $\lambda$ and $\xi$, respectively. These steps are implemented as tensor subtraction and summation operations. The updated result of $\lambda$ after gradient ascent is passed through an activation layer 939 (e.g., an additional ReLU layer) to satisfy the non-negative constraint on $\lambda$.

Figure 10:
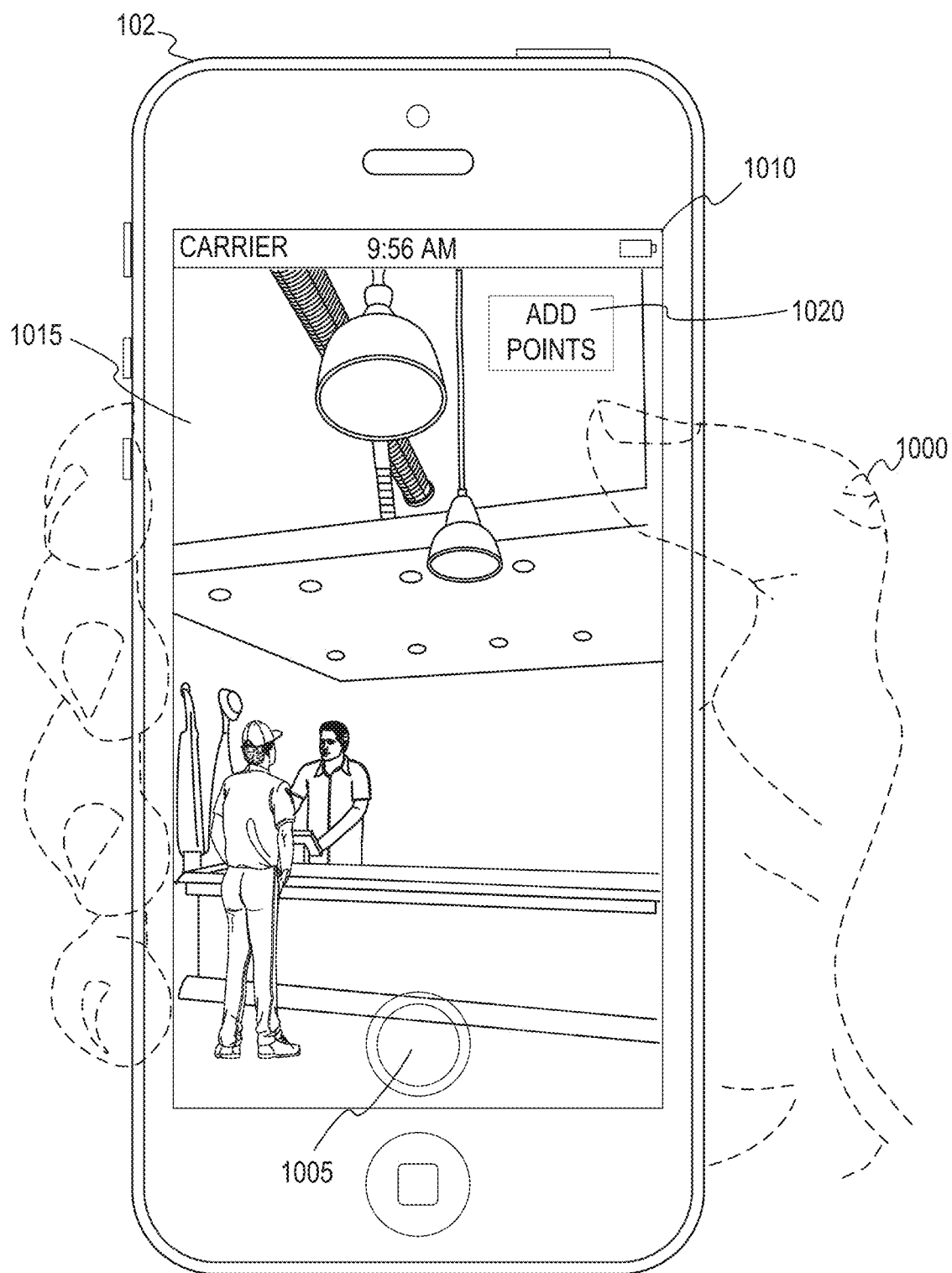
FIGS. 10-13 show example user interfaces for implementing the active depth system, according to some example embodiments.

FIGS. 10-13 show example user interfaces for implementing the active depth system 150, according to some example embodiments. As illustrated in FIG. 10, a user 1000 is holding a client device 102 which displays a user interface 1010. The user 1000 has generated an image 1015 using a capture image button 1005. To input click pair data, the user 1000 selects an add points button 1020. Turning to FIG. 11, the user 1000 has selected the add points button 1020 and screen tapped twice to create one click pair set. In particular, the user 1000 has screen tapped at a point 1100 followed by screen tapping at a point 1105 to indicate that the pixel corresponding to the point 1100 is closer than the pixel corresponding to the point 1105. Although in the examples discussed the first point is closer than the second point, it is to be appreciated that the ordinal pair data can be configured in the reverse direction (e.g., the first point indicates that that point is farther away than a subsequent second point). The active depth system 150 receives the screen taps and generates an arrow connecting the two points 1100 and 1105 to indicate that the direction of depth for that area of the image (e.g., the depicted ceiling above the cashier) is in the direction of the arrow created by the two points. While the ordinal pair in the examples discussed here is generated by a pair of clicks provided by the user, it is to be appreciated that ordinal pair data can be generated in other ways, such as by swipe gestures or by inputting coordinates of a first point and a second point into text input fields.

Figure 12:
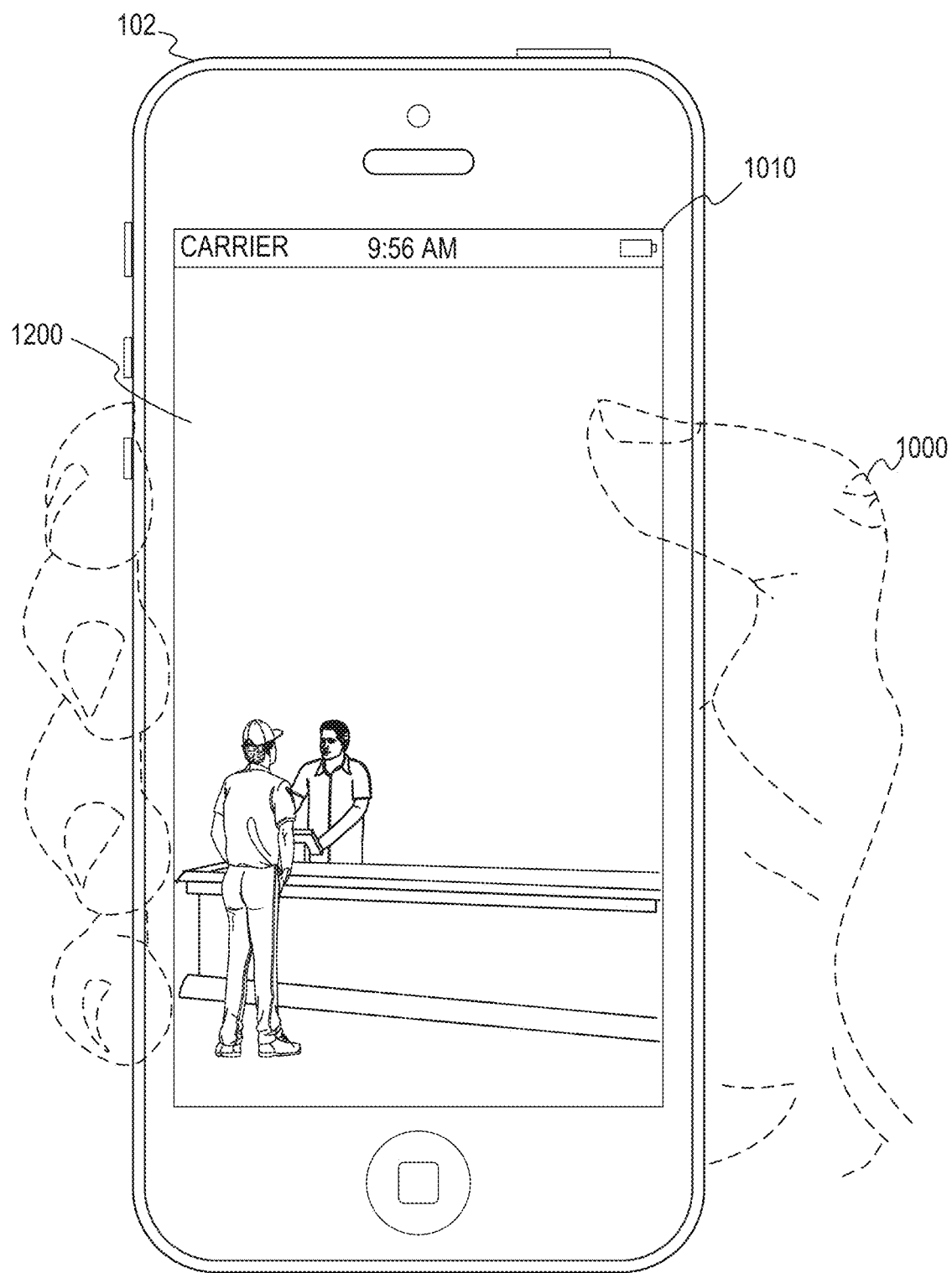
Figure 13:
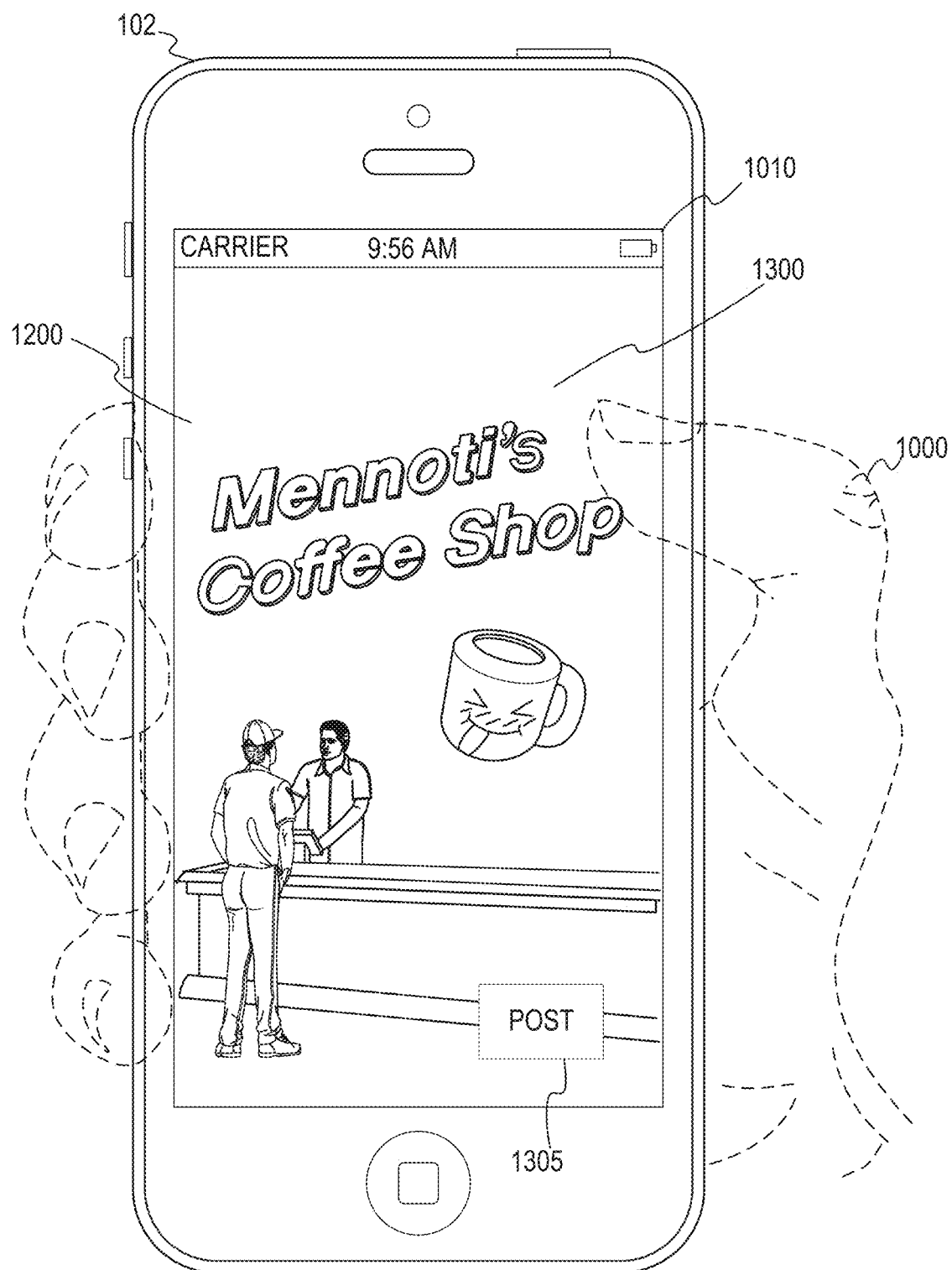

In response to receiving a click pair (e.g., the points 1100 and 1105), the depth engine 610 generates a base depth map of the image 1015 and further uses the click pair to generate and store a refined depth map using the click pair, as discussed above. Turning to FIG. 12, the content engine 615 can be configured to generate a modified image 1200 from the image 1015 using the generated refined depth map. In particular, the content engine 615 uses the refined depth map to identify background areas of the image 1015 and remove the background areas to generate the modified image 1200. Turning to FIG. 13, the content engine 615 can be further configured to overlay additional content, such as location content 1300, on the modified image 1200. The user 1000 can then select a post button 1305 to publish the modified image 1200 with the overlay content (e.g., the location content 1300) as an ephemeral message on a network site.

Figure 14:
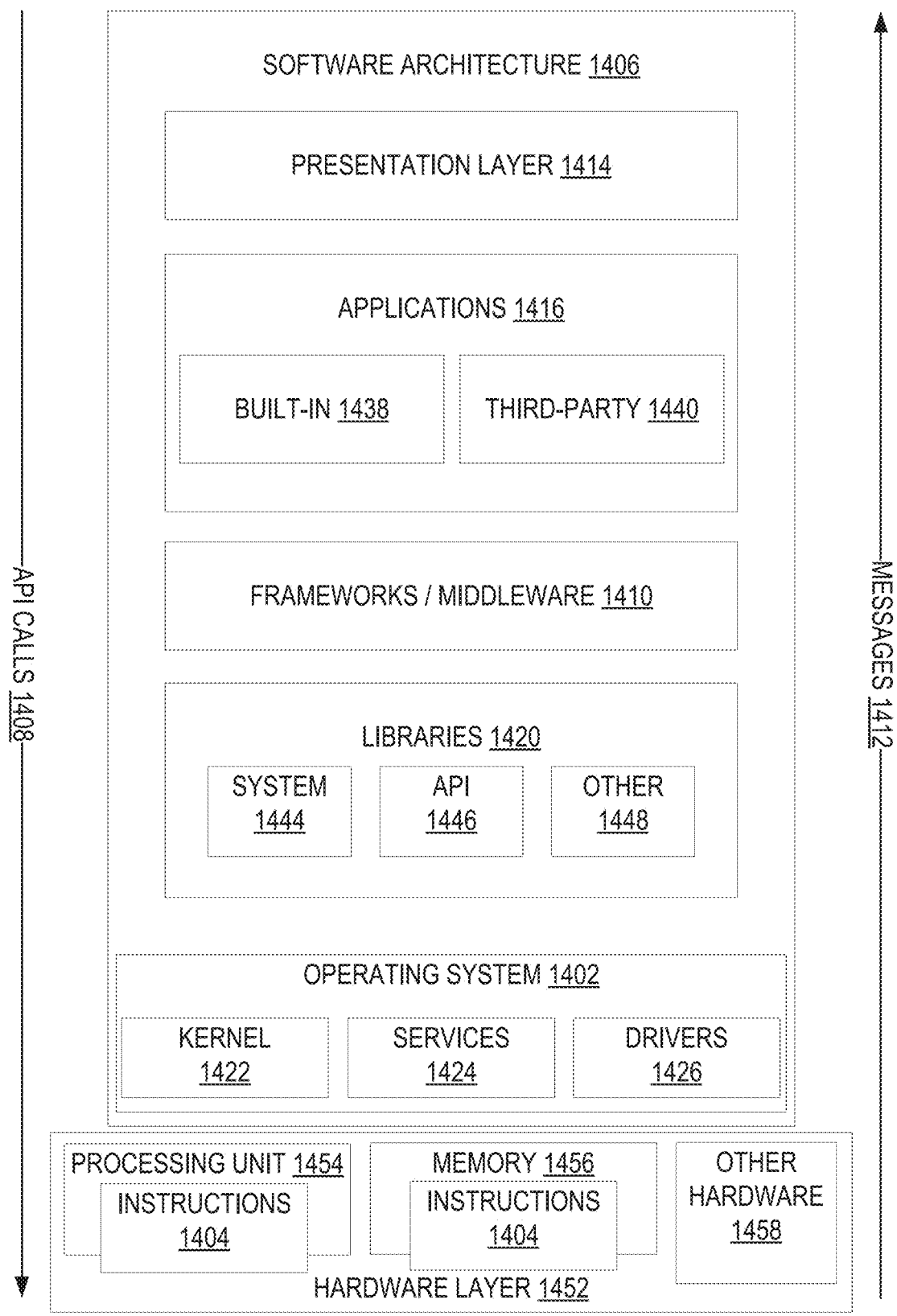
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture, and it will be appreciated that many other architectures may be implemented to facilitate the functionality described herein. The software architecture 1406 may execute on hardware such as a machine 1500 of FIG. 15 that includes, among other things, processors 1510, memory 1530, and I/O components 1550. A representative hardware layer 1452 is illustrated and can represent, for example, the machine 1500 of FIG. 15. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes memory and/or storage modules 1456, which also have the executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1410, applications 1416, and a presentation layer 1414. Operationally, the applications 1416 and/or other components within the layers may invoke API calls 1408 through the software stack and receive a response in the form of messages 1412. The layers illustrated are representative in nature, and not all software architectures have all layers. For example, some mobile or special-purpose operating systems may not provide a frameworks/middleware 1410, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1410 provide a higher-level common infrastructure that may be used by the applications 1416 and/or other software components/modules. For example, the frameworks/middleware 1410 may provide various graphic user interface (GUI) functions, high-level resource management, high-level location services, and so forth. The frameworks/middleware 1410 may, provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1406 provided by the mobile operating system (such as the operating system 1402) to facilitate functionality described herein.

The applications 1416 may use built-in operating system functions (e.g., kernel 1422, services 1424, and/or drivers 1426), libraries 1420, and frameworks/middleware 1410 to create user interfaces to interact with users of the system. Alternatively, or additionally, in some systems interactions with a user may occur through a presentation layer, such as the presentation layer 1414. In these systems, the application/component "logic" can be separated from the aspects of the application/component that interact with a user.

Figure 15:
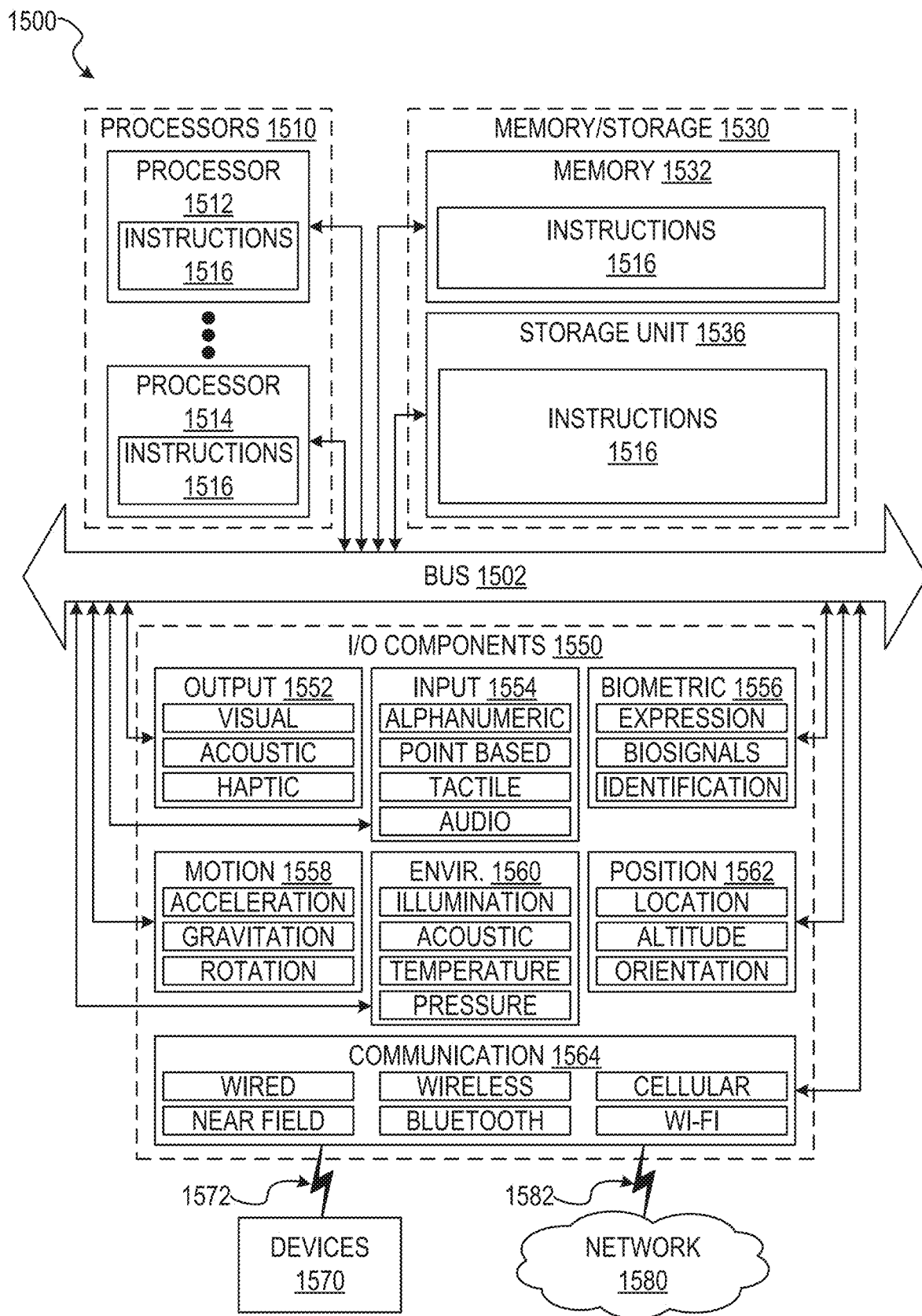
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. As such, the instructions 1516 may be used to implement modules or components described herein. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute the instructions 1516 to perform any one or more of the methodologies discussed herein.

The machine 1500 may include processors 1510 having individual processors 1512 and 1514 (e.g., cores), memory/storage 1530, and I/O components 1550, which may be configured to communicate with each other such as via a bus 1502. The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

The I/O components 1550 may include a wide variety of components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion, and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environment components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environment components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or other suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF415, Ultra Code, UCC RSS-2D barcode, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation; location via detecting an NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation. Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner.

In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily, configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction. Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   storing, on a user device, a first neural network and a second neural network, the first neural network in use outputting into the second neural network;
   identifying, on the user device, an image depicting an environment;
   receiving, by the user device, an ordinal pair indicating a direction of depth in the environment depicted in the image;
   generating, on the user device, an initial depth map from the image using the first neural network;
   generating, on the user device, an updated depth map by inputting the received ordinal pair and the initial depth map into the second neural network; and
   storing the updated depth map.

2. The method of claim 1, further comprising:
   generating a modified image by modifying the image using the updated depth map.

3. The method of claim 1 wherein the second neural network is a recurrent neural network.

4. The method of claim 3, wherein the recurrent neural network is trained to implement an alternating direction method of multipliers scheme.

5. The method of claim 3, wherein the first neural network is a trained neural network and the second neural network is configured to receive the ordinal pair as constraints after training of the trained neural network.

6. The method of claim 1, further comprising:
   receiving, by the user device, at least one additional ordinal pair, each additional ordinal pair indicating an additional direction of depth in the environment depicted in the image.

7. The method of claim 1, further comprising:
   generating, on the user device, the image using an image sensor of the user device; and
   displaying the generated image on a display device of the user device.

8. The method of claim 7, wherein receiving the ordinal pair comprises receiving a first point on the image and a second point on the image while the generated image is displayed on the display device.

9. The method of claim 2, further comprising:
   identifying, using the updated depth map, a background area of the image.

10. The method of claim 9, wherein the modified image is generated by applying an image effect to the background area of the image.

11. A system comprising:
    one or more processors of a machine; and
    a memory storing instructions that, when executed by at least one processor among the one or more processors, cause the machine to perform operations comprising:
    storing, in the memory, a first neural network and a second neural network, the first neural network in use outputting into the second neural network;
    identifying, in the memory, an image depicting an environment;
    receiving an ordinal pair indicating a direction of depth in the environment depicted in the image;
    generating an initial depth map from the image using the first neural network;
    generating an updated depth map by inputting the received ordinal pair and the initial depth map into the second neural network; and
    storing the updated depth map in the memory.

12. The system of claim 11, wherein the operations further comprise:
    generating a modified image by modifying the image using the updated depth map.

13. The system of claim 11 wherein the first neural network is a trained neural network and the second neural network is configured to receive the ordinal pair as constraints after training of the trained neural network.

14. The system of claim 11, wherein the system comprises a display device, and wherein receiving the ordinal pair comprises receiving a first point on the image and a second point on the image while the image is displayed on the display device.

15. A method comprising:
    identifying, on a user device, an image depicting an environment;
    receiving, by the user device, an ordinal pair indicating a direction of depth in the environment depicted in the image;
    generating a depth map by inputting the received ordinal pair into a depth engine running on the user device; and
    storing the depth map.

16. The method of claim 15, wherein the depth engine comprises a neural network.

17. The method of claim 15, further comprising:
    generating a modified image by modifying the image using the depth map; and
    displaying the modified image on a display device of the user device.

18. The method of claim 15, further comprising:
    receiving, by the user device, at least one additional ordinal pair, each additional ordinal pair indicating an additional direction of depth in the environment depicted in the image.

19. The method of claim 15, further comprising:
    generating, on the user device, the image using an image sensor of the user device; and
    displaying the generated image on a display device of the user device, wherein receiving the ordinal pair comprises receiving a first point on the image and a second point on the image while the image is displayed on the display device, and wherein the order of receipt of the first and second points indicates a relative depth order between the first and second points in the depth direction.

20. The method of claim 15, further comprising:
    identifying, using the depth map, a background area of the image; and
    generating a modified image by applying an image effect to the background area of the image.

* * * * *